US008029052B2

(12) United States Patent
Kadzban et al.

(10) Patent No.: US 8,029,052 B2
(45) Date of Patent: Oct. 4, 2011

(54) ROOF SYSTEM FOR A VEHICLE

(75) Inventors: Mark P. Kadzban, Grandville, MI (US); Matthew A. Kalis, Hudsonville, MI (US); Scott A. Hansen, Holland, MI (US); Nels R. Smith, Zeeland, MI (US); Jennifer A. Werth, Holland, MI (US)

(73) Assignee: Johnson Controls Technology Company, Holland, MI (US)

( * ) Notice: Subject to any disclaimer, the term of this patent is extended or adjusted under 35 U.S.C. 154(b) by 884 days.

(21) Appl. No.: 11/915,790

(22) PCT Filed: May 31, 2006

(86) PCT No.: PCT/US2006/020713
§ 371 (c)(1),
(2), (4) Date: Mar. 3, 2008

(87) PCT Pub. No.: WO2006/130543
PCT Pub. Date: Dec. 7, 2006

(65) Prior Publication Data
US 2008/0272623 A1    Nov. 6, 2008

Related U.S. Application Data

(60) Provisional application No. 60/686,638, filed on Jun. 2, 2005.

(51) Int. Cl.
*B60J 10/12* (2006.01)
*B60J 7/057* (2006.01)
*B60R 13/07* (2006.01)

(52) U.S. Cl. .............. 296/216.01; 296/210; 296/223

(58) Field of Classification Search .......... 296/216.01, 296/210, 223
See application file for complete search history.

(56) References Cited

U.S. PATENT DOCUMENTS

2005/0073851 A1 * 4/2005 Itoh et al. ............... 362/487
2008/0158510 A1 * 7/2008 Tant et al. ................ 353/14

FOREIGN PATENT DOCUMENTS

| EP | 1 065 557 A2 | 1/2001 |
| WO | WO 01/84230 A | 11/2001 |
| WO | WO 01/84230 A1 | 11/2001 |
| WO | WO 02/10844 A2 | 2/2002 |

OTHER PUBLICATIONS

European Patent Office Communication corresponding to EP 06771463.4, dated Sep. 22, 2009, 8 pages.

* cited by examiner

*Primary Examiner* — Mike Qi
(74) *Attorney, Agent, or Firm* — Foley & Lardner LLP

(57) ABSTRACT

A roof system for a vehicle includes a panel assembly having a transparent roof panel (14), a privacy panel (18), and a transparent display panel (16). An image generator (40) is configured to display an image on the display panel (16) and a control system operates the image generator (40) and actuates the privacy panel (18) between a transparent mode and an opaque mode. The system may also includes a perimeter trim member (20) having a perimeter ventilation system surrounding the panels. The transparent display panel (16) may also be provided with a user interface region having instruments, displays and touch-activated switches (52). The system may also include ambient lighting bands (60) adjacent to the perimeter of the panels.

29 Claims, 6 Drawing Sheets

ROOF SYSTEM FOR A VEHICLE

CROSS REFERENCE TO RELATED APPLICATIONS

The present patent application claims the benefit of priority as available under 35 U.S.C. §119(e)(1) to U.S. Provisional Patent Application No. 60/686,638 titled "Roof System for a Vehicle" filed on Jun. 2, 2005, the subject matter of which is incorporated by reference herein.

BACKGROUND

The present inventions relate generally to a roof system for a vehicle. More specifically, the present inventions relate to a vista roof system capable of displaying images on a roof panel in a vehicle and permitting occupants of the vehicle to view through the roof panel. The present inventions also relate to a ventilation system for use with a vista roof system and ambient lighting bands and a user-interface segment on the panel.

Roof panels for use in vehicles are generally known. For example, conventional roof systems may include a transparent panel or window along the roof of the vehicle to permit occupants within the vehicle to "see through" the roof and view overhead external surroundings. However, the view provided through such transparent roof panels is typically limited to the surroundings, scenery and lighting available at the particular location of the vehicle. In another example, "sunroofs" and "moon-roofs" for vehicle roofs are also generally known for permitting a vehicle user to "open" a transparent or non-transparent portion of the vehicle roof for viewing, ventilation, etc. However, the view provided by such sunroofs and moon-roofs are also typically limited to the surroundings, scenery and lighting available at the particular location of the vehicle, and may in some cases require opening the roof to obtain the view. In a further example, video display panels mounted to a roof panel and configured to "fold down" for viewing by occupants of the vehicle are also generally known. However, such display panels typically do not also provide capability of direct viewing of the vehicle's surroundings through the display panel. Further, such display panels typically do not include built-in touch-control devices and ventilation capacity.

Accordingly, it would be desirable to provide a roof system having a generally transparent panel (e.g. glass panel, etc.) configured for viewing of the external surroundings by occupants of the vehicle. It would also be desirable to provide a roof system having a display panel formed on, in, or with the transparent panel to display images (e.g. video images, etc.) on the transparent panel for viewing by the occupants of the vehicle (e.g. when viewing of external surroundings is unavailable, undesirable, not preferred, etc.). It would be further desirable to provide a roof system having a transparent display panel configured to receive and display various images for viewing by occupants of the vehicle. It would be further advantageous to provide the transparent display panel in a wide variety of sizes and shapes for use in a roof panel of a vehicle. It would also be advantageous to provide a transparent display panel that permits viewing the external surroundings in one mode and that receives uploaded data for displaying images on the roof in another mode. It would be further advantageous to provide an image source or generator configured to provide data to the transparent display panel for display images as desired by an occupant of the vehicle. It would also be advantageous to provide a transparent display panel with touch-control actuation switches. It would be further advantageous to provide structure surrounding the transparent display panel to provide ventilation to or from the vehicle cabin.

Accordingly, it would be desirable to provide a roof system for a vehicle having any one or more of these or other advantageous features.

SUMMARY

According to one embodiment, a vista roof system is disclosed and includes (among other features) a transparent view-through roof panel, a privacy panel, a transparent display panel, an illumination source, a power supply and an image generator. The transparent view-through roof panel is shown as an external "window" on the vehicle roof that may provide weatherproofing and structural support to the roof. The privacy panel is shown adjacent to the transparent view-through panel and is intended to be changeable between a transparent condition to permit viewing external surroundings and an opaque condition (e.g. white, off-white, etc.) to prevent viewing through the transparent panel and to support use of the display panel. The transparent display panel is shown adjacent to the privacy panel and is intended to be capable of operation in a transparent mode so that occupants may view the external surroundings through the display panel and the privacy panel (in the transparent condition) and the roof panel. The transparent display panel is also capable of operation in an image mode for displaying an image (such as received from the image generator), so that occupants of the vehicle may selectively view the external surroundings through the roof system or view images displayed on the roof system. A transparent panel (with or without a privacy and/or display panel) may also include a user interface having a plurality of touch-activated switches and information displays formed along a translucent border region of the transparent panel for activation or perception by an occupant of the vehicle. One or more ambient lighting bands may also be provided at least partially along the perimeter of the transparent panel to provide low-intensity, mono or variable color lighting within the vehicle cabin. A perimeter trim member may also be used to surround and support the transparent panel, and may have a ventilation system with a cavity or plenum and vent opening formed therein for providing a source of ventilation surrounding a perimeter of the transparent panel.

DETAILED DESCRIPTION

The FIGURES illustrate an exemplary embodiment of an assembly of components shown as a vista roof system for use in a vehicle (e.g., automobiles such as cars, minivans, trucks, buses, and the like; airplanes, boats, etc.). Such vista roof systems may be provided in a wide variety of sizes, shapes, materials and configurations (i.e. one or more panels, etc.) according to various exemplary embodiments. The components shown and described for the vista roof system may also be used to permit see-through viewing and image display for other windows or transparent panels within a vehicle. Accordingly all such vista roof systems are intended to be within the scope of the subject matter described herein.

Figure 3A:
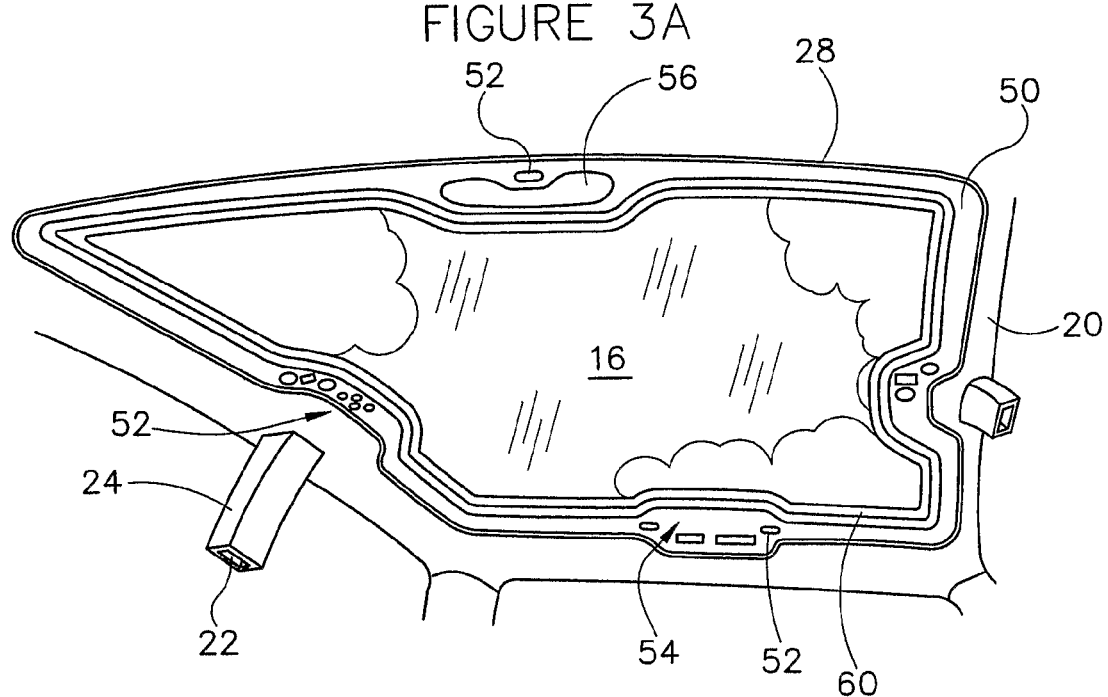
FIGS. 3A-3D are schematic illustrations of a roof system have various display images provided thereon.
Figure 3B:
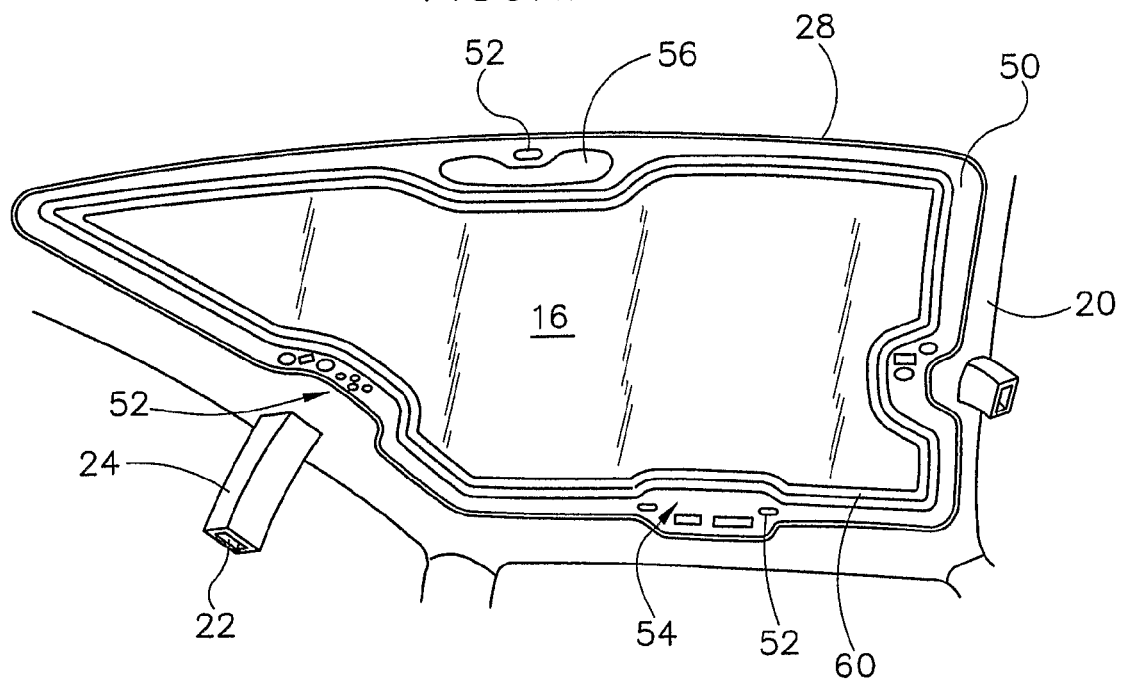
Figure 3C:
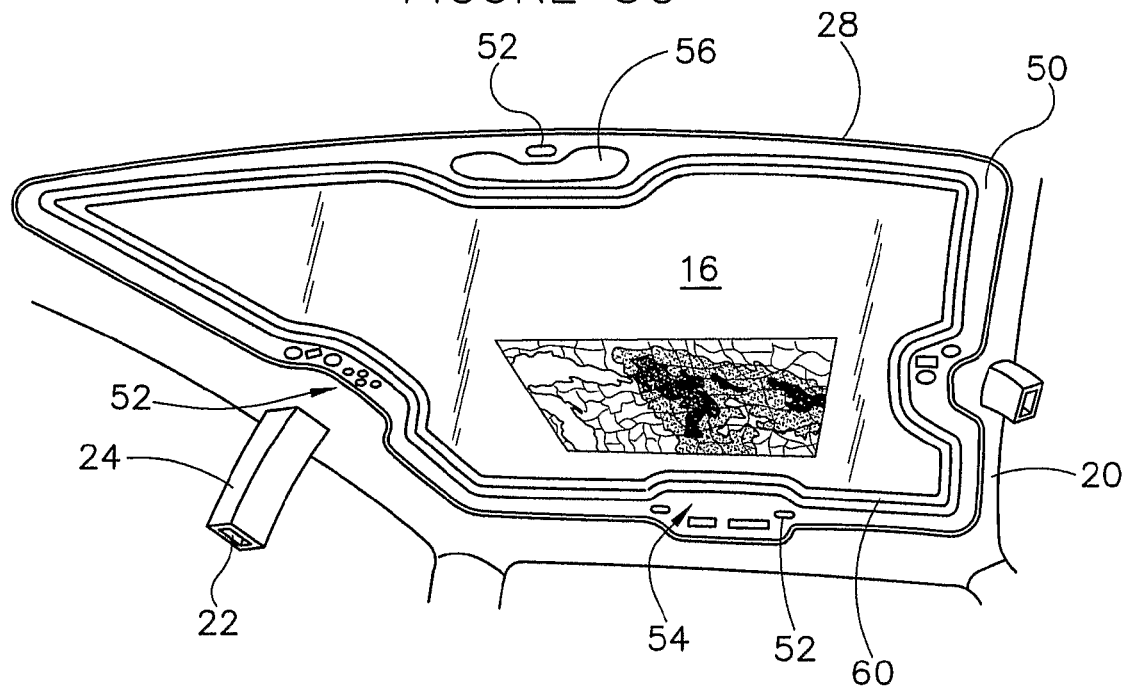
Figure 3D:
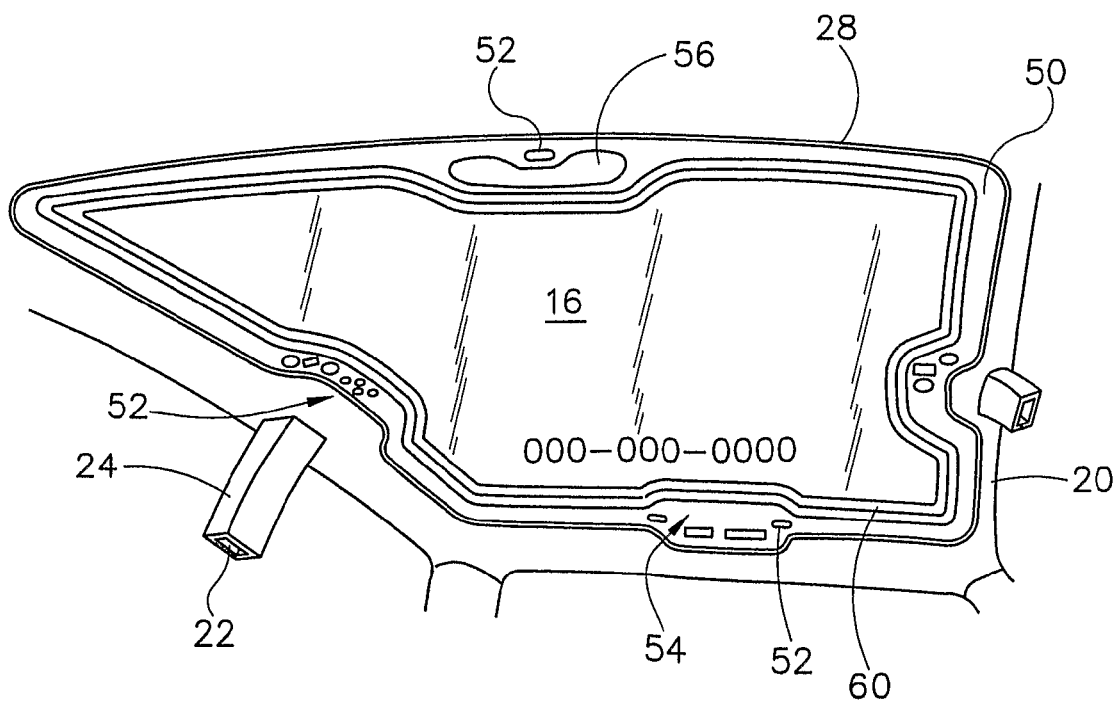

Referring to the FIGURES, the vista roof system 10 is shown according to an exemplary embodiment and is intended for use in a first mode (e.g. vista mode, etc.—see for example FIG. 3A where the roof is substantially transparent) to provide a roof panel assembly 12 that permits occupants of a vehicle to see-through the roof for viewing external surroundings. The vista roof system 10 is also intended for use in a second mode (e.g. privacy mode, etc.—see FIG. 3B) to provide a roof panel assembly 12 that is generally opaque and does not permit (or substantially limits) viewing (e.g. prevents or restricts outsiders from looking in, blocks or reflects sunlight, etc.). The vista roof system 10 is also intended for use in a third mode (e.g. display mode, etc.—see FIGS. 3C-3D) for displaying objects or images on the interior roof of the vehicle for viewing by occupants of the vehicle (e.g. when viewing the external surroundings in the vista mode is unavailable, undesirable, not preferred, etc.).

Referring to the FIGURES, the roof panel assembly 12 of the vista roof system 10 are shown having a shape and size intended to cover a majority of the roof area of a vehicle, and are substantially surrounded by a perimeter trim member(s) 20 (e.g. frame, support, etc.) that provides structural and functional support to the roof panel assembly 12, and acts as a trim piece or bezel for "trimming out" the overhead area of the vehicle. The perimeter trim member 20 may be provided as a single piece, or as multiple pieces configured for interconnection, or as extendable/retractable (e.g. telescoping, etc.) members configured for use with roof panels of varying sizes (e.g. for multiple vehicle programs, etc.). The perimeter trim member 20 may also be configured for retaining other overhead components (e.g. consoles, instruments, visors, grab-handles, communication devices (e.g. speakers, microphones, switches, etc.), wiring and electrical components, illumination devices, head impact countermeasure (HIC) devices, etc.—not shown). According to alternative embodiments, the panels of the roof panel assembly 12 may be provided in a wide variety of sizes and shapes, and for various types of vehicles and vehicle programs. For example, the panels of the vista roof system may be generally "fixed" as shown in the FIGURES, but may also be movable, such as in the form of a sunroof or moon-roof window that is liftable, slidable, tiltable, etc., or may be removable (e.g. for service, repair, etc.). In addition, the panel assembly may be provided as a single panel or as multiple panels.

Figure 1:
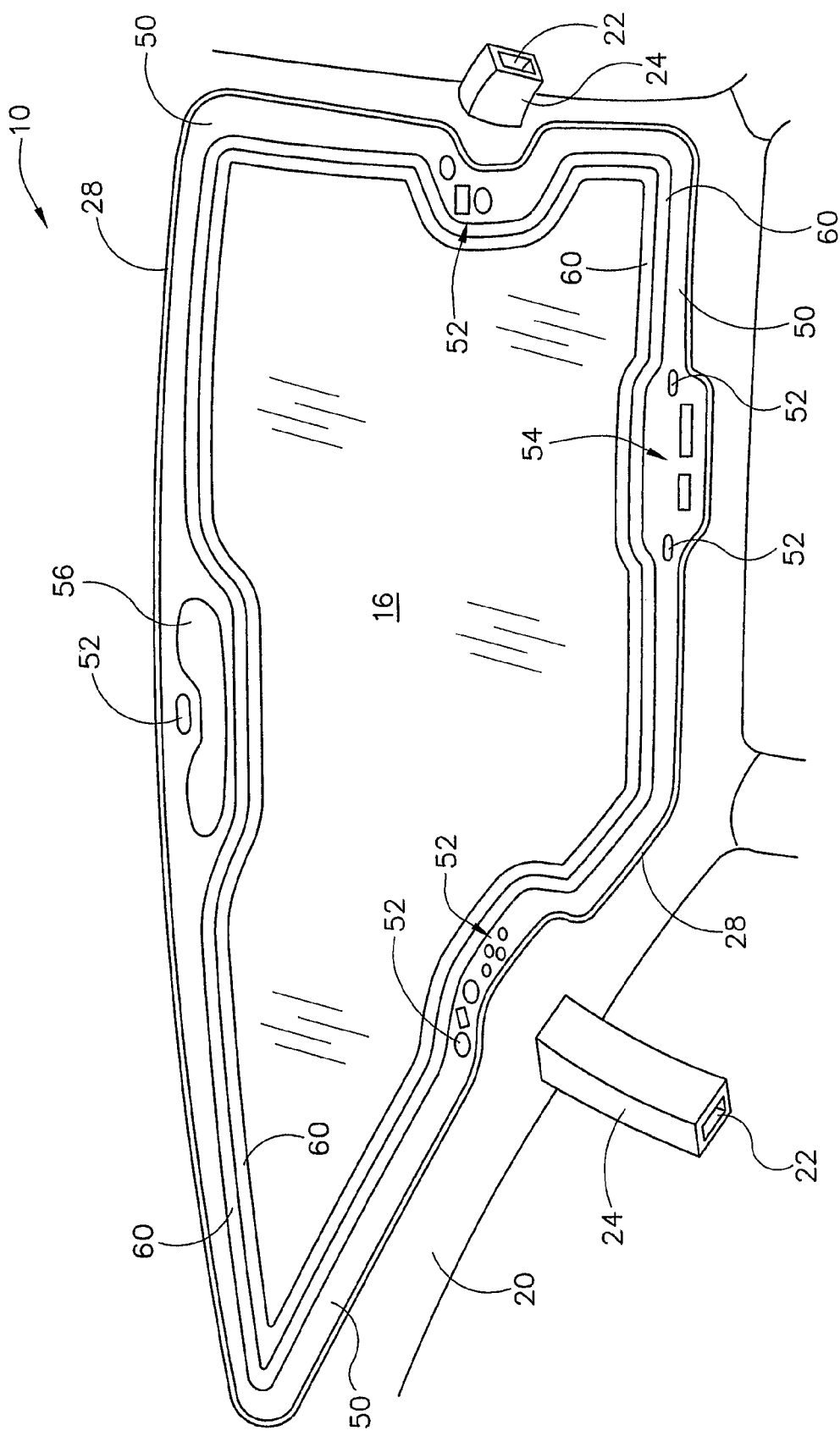
FIG. 1 is a schematic illustration of a perspective view of a roof system according to another exemplary embodiment.

The perimeter trim member 20 is also shown to include a ventilation system comprising air supply passages 22 (e.g. ducts, etc.) integrated within side pillars 24 of the vehicle body (shown for example as two ducts within a hollow "B" pillar in FIG. 1) that communicate with an airspace shown as a cavity or plenum 26 (see FIG. 2) behind the perimeter trim member 20 for directing a flow of air through an opening 28 (e.g. slot, gap, slit, vent, etc.) formed in the perimeter trim member 20 around the all, or a portion, of the perimeter of the roof panel assembly 12 so that the vehicle cabin may be ventilated by directing or driving a flow of air with a fan (not shown) through passages 22 and vent 28. The airflow may also be generated by any suitable arrangement for creating a pressure differential (e.g. positive or negative) between the vehicle cabin and exterior environment. According to an alternative embodiment, the air may be drawn through the vent in a reverse direction to remove air from the vehicle cabin (such as when the cabin is at an elevated temperature after being parked in sunlight, etc.) by operating the fan (or generating a pressure differential) in a reverse direction. According to a further alternative embodiment, a supplemental fan may be disposed within or proximate the plenum and arranged to communicate through a roof vent with the external environment, so that a user may actuate the supplemental fan through suitable controls (such as touch-activated controls integrated with the roof panel as shown for example in FIG. 1), to draw air from the external environment into the cabin (with the supplemental fan operating in one direction) or to discharge air from the vehicle cabin to the external environment (with the supplemental fan operating in the reverse direction). According to a further alternative embodiment, the vent may be formed by a gap arranged between two partially overlapping segments of a perimeter trim member assembly, so that a peripheral vent is formed between two vertically "stacked" portions of a perimeter trim assembly.

Figure 2:
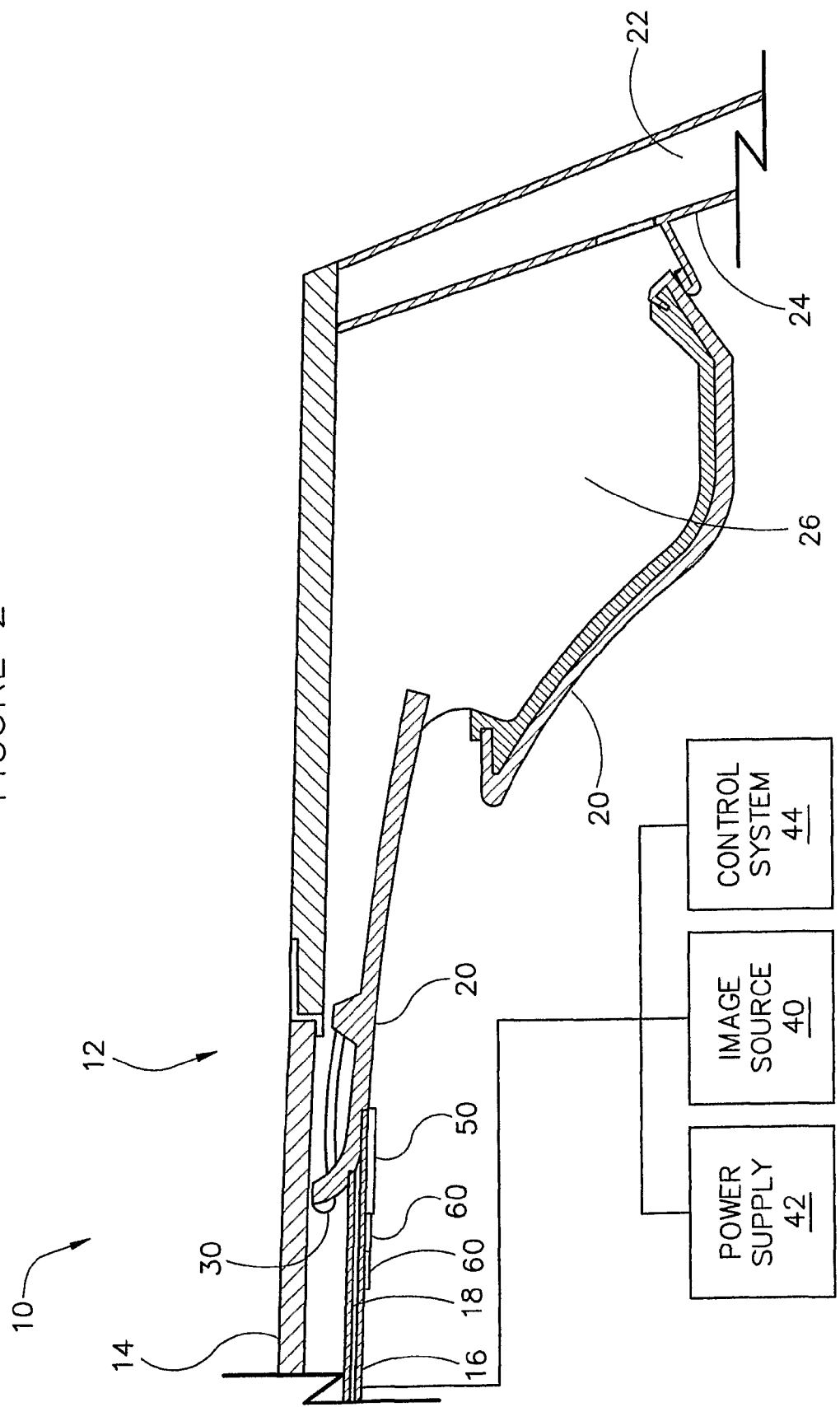
FIG. 2 is a schematic illustration of a partial cross sectional view of a roof system according to an exemplary embodiment.

Referring to FIG. 2, the arrangement of the panels of the roof panel assembly 12 are shown according to an exemplary embodiment. The panels of the roof system are shown "layered" in a generally "stacked" arrangement where the transparent roof panel 14 is shown as an external panel, the transparent display panel is shown as an internal panel 16, and the privacy panel 18 is shown positioned between the roof panel 14 and the display panel 16. The edges of the panels may be provided with a suitable seal or gasket intended to prevent entry of moisture or other contaminants within the space between the panels. According to the illustrated embodiment, in the vista mode, the privacy panel 18 is transparent and the display panel is transparent 16 (i.e. not displaying an image) so that an occupant of the vehicle may see-through the layered panels and view surroundings (or other objects) external to the vehicle. In the privacy mode, the privacy panel 18 becomes substantially opaque (and in a desired color) to "block" or prevent viewing through the roof of the vehicle (e.g. to prevent sunlight exposure, or to prevent visual access by others outside the vehicle, etc.). According to one embodiment, the privacy panel 18 may include electrochromic (EC) glass technology (such as, for example, EC technology used to darken rear view mirrors in vehicles). According to another embodiment, the privacy panel 18 may include a translucent white EC material in large format (e.g. such as, for example, EC technology used to self-shade building windows). The privacy panel 18 may be configured for use with either light or dark opaqueness depending on the intended application and images to be displayed, and/or the color and effect of the background on the images to be displayed. According to alternative embodiments, any suitable technology may be used for changing the privacy panel from a transparent condition to an opaque condition, or by further way of example, for changing the privacy panel from having a reflective finish to a non-reflective finish. In the display mode, the privacy panel 18 remains opaque and serves as a contrasting "backscreen" for the images displayed on the transparent display panel 16.

As shown in FIG. 2, for embodiments that use a backlighted display, an illumination source 30 may be provided between the roof panel 14 and the privacy panel 18 and attached to, or embedded in, the perimeter trim member 20 for providing a source of illumination along a back side of the privacy panel 18 (when viewed from the vehicle interior). The illumination source 30 may be provided by light emitting diodes (e.g. white LEDs and/or colored LEDs that may be mounted along an edge of the panel or light-piped to the panel), incandescent bulbs, or other suitable illumination source. According to an alternative embodiment, the roof system may be provided without a privacy panel. For example, the roof system may be provided with a single panel that is transparent in one mode and may be activatable to an opaque condition in a second mode for privacy. The single panel may also be capable of displaying images directly on a surface of the panel for viewing by a user.

According to one embodiment, the roof panel 14 is a substantially transparent member made from a suitable material (e.g. glass, etc.) and having a suitable thickness to provide the desired structural support for the roof system 10 on the vehicle. The privacy panel 18 is shown positioned interior and adjacent to the roof panel 14 and may be separated by a gap having a sufficient size intended to provide an area for backlighting the privacy panel 18 when operating in the display mode. The privacy panel 18 is made of a suitable material (e.g. glass, etc.) having characteristics that are capable of changing from a substantially transparent condition (for use in the vista mode) and an opaque condition (e.g. white, off-white, black, etc.) for use in preventing or blocking visual access through the roof during the privacy mode and to act as a back-screen to provide contrast (and/or backlighting) for the images displayed on the display panel 16 during the display mode. The display panel 16 is formed from a relatively thin, transparent substrate material (e.g. plastic, polymer, glass, etc.) having a display formed from suitable devices or technology such as thin-film transistors (TFT), or organic light emitting diodes (OLED), electrophoretics, liquid-crystal technology, or any other suitable technology or device (now known or future-developed) intended to display an image on a substantially transparent surface.

Referring further to FIG. 2, during the display mode, an occupant of the vehicle may select (e.g. by actuating certain designated touch-activated switches) various images from an image source 40 (image generator, etc.) for viewing on the display panel 16. The image generator 40 is preferably a computer device configured to communicate (e.g. transmit, upload, link, etc.) the image data to the display panel 16. The image data may be communicated via a suitable wire/cable and connector system (e.g. including USB ports, etc.—which may be routed along a back or "C" side of the perimeter trim member 20) or may be communicated in a wireless manner (e.g. infrared, RF, Bluetooth, etc.). The images may be generally "still" images (as shown for example in FIG. 3D), such as designs, abstract images, logos, insignias, pictures, photographs, murals, business information, operations or owner's manual information, or any of a wide variety of other still images. The images may also be "dynamic" images (as intended to be shown in the graphic representation of a radar weather map in FIG. 3C), such as movie images, video clips, television images, weather maps, driving directions, interactive road maps, etc. The image generator 40 may be any suitable device for communicating data for display of an image on the display panel 16, such as a DVD player, MP3 player, iPod®, TiVo®, satellite receiver, PhatNoise® module, telephone, portable computing device, personal data assistant (PDA), etc. and may communicate in a hard-wired or wireless manner with the display panel. For example, the image generator 40 may be configured to communicate with a telephone and send data to the display panel for display the telephone number (and/or other data) related to an incoming telephone call. The display panel 16 may also be provided with data memory for storage of various images that may be directly selected for viewing by an occupant of the vehicle (e.g. from a console 70 on the roof system (see FIGS. 4A-4B), or a remote control device, etc.).

The roof system 10 also includes suitable wiring systems of a conventional type for providing power from a power source 42 or supply (e.g. vehicle battery system, etc.) to the display panel and the illumination devices, which may be routed along the C side of the perimeter trim member 20, or within the perimeter trim member(s) 20. The display panel 16 may also be configured to interface with the lighting system of an instrument panel of the vehicle, so that adjustment of the color or brightness of the instrument panel display will also result in a corresponding change in the color theme or brightness of the display panel.

According to one embodiment, the roof system 10 include a control system 44 intended to control operation of the roof system in the various modes. For example, the control system 44 may include suitable switches (shown as touch-activated switches 52 shown schematically in FIG. 1), wiring, connectors and electronics of a conventional type (or future-developed type) for turning the illumination device 30 on and off, and for changing the privacy panel 18 between the transparent condition and the opaque condition, and for providing power to the display panel 16, and for uploading data for display of images on the display panel 16, and for communicating with other components of the vehicle (e.g. instrument clusters, instrument panel, telephones, permanent or handheld GPS navigation devices, for changing the color of the ambient lighting devices 60 as the color of the displayed image changes, etc.). The control system 44 is intended to include a suitable interface through the touch-activated switches for operation by an occupant of the vehicle. However, the control system may also be activated by any other suitable interface, such as a control panel mounted within the vehicle, hand-held remote control device, voice-activated control device, etc.

Referring further to FIGS. 1 and 2, one panel of the roof panel assembly (shown for example as the transparent display panel 16, but may also be a single transparent panel for applications without a display or privacy function, or systems having a single panel) also includes a user-interface segment 50 on the transparent panel 16, shown for example as an opaque border (e.g. black, or other color intended to coordinate with an interior trim color scheme, etc.) which includes various touch-activated switches 52 (such as capacitance switches, etc.) that are provided for control of equipment such as the ventilation system, lighting, operation of the vista roof panel system, etc.), and various information displays 54 for communicating information to the user, and other objects such as lights 56. According to a preferred embodiment, the user-interface border 50 is provided as a black colored border with a gloss finish, however, any suitable finish may be used (e.g. matte, textured, etc.). User interface border 50 may also include a wide variety of other components integrated therein, such as "hidden" instrumentation and/or indicators (e.g. a compass, multi-function computer and display, task lighting, HVAC controls, temperature displays, back-lit icon-graphics, warning lights/indicators, remote actuation devices such as Homelink®, tire pressure monitor readouts, etc.). According to one embodiment, the functional elements built into or integrated with the border may remain "hidden" until activated (e.g. by activation by a user through touch, voice, etc.), or certain functional elements may be visible whenever the vehicle is occupied (such as through motion sensors in the vehicle cabin, activation of the vehicle ignition switch, etc.).

Referring further to FIGS. 1 and 2, ambient lighting devices (shown schematically as peripheral bands or "light frames" 60) are intended to provide "soft" or low-intensity lighting are shown "layered" or otherwise integrated with transparent panel 16 and may be arranged internally or externally in relation to the user-interface border 50. The ambient light devices or bands 60 may be provided with any particular color or combination of colors and may be equipped with illumination sources such as LEDs that are located behind a cover having a light-dispersing coating or composition, or other suitable arrangement, such as light-pipe technology. The color of the light provided by the illumination source may be constant, or may be variable. For example, the color may be changed or the intensity varied by manual selection from a user, or the color may be automatically changed to coordinate/compliment the color of images generated by the image generator 40 and displayed on the display panel. The illumination sources for the lighting bands 60 may be controlled by the touch-activated switches 52 (or other suitable control devices) and may be arranged for on-off operation, or for variable-dimming operation. The ambient lighting bands 60 are shown to surround the perimeter of a roof panel, but may also be arranged to "accent" or "outline" a certain region on the roof panel or segregate one portion of the roof panel from another portion of the roof panel, or provided as "spots" or "islands" to provide a desired ambient lighting arrangement.

Figure 4A:
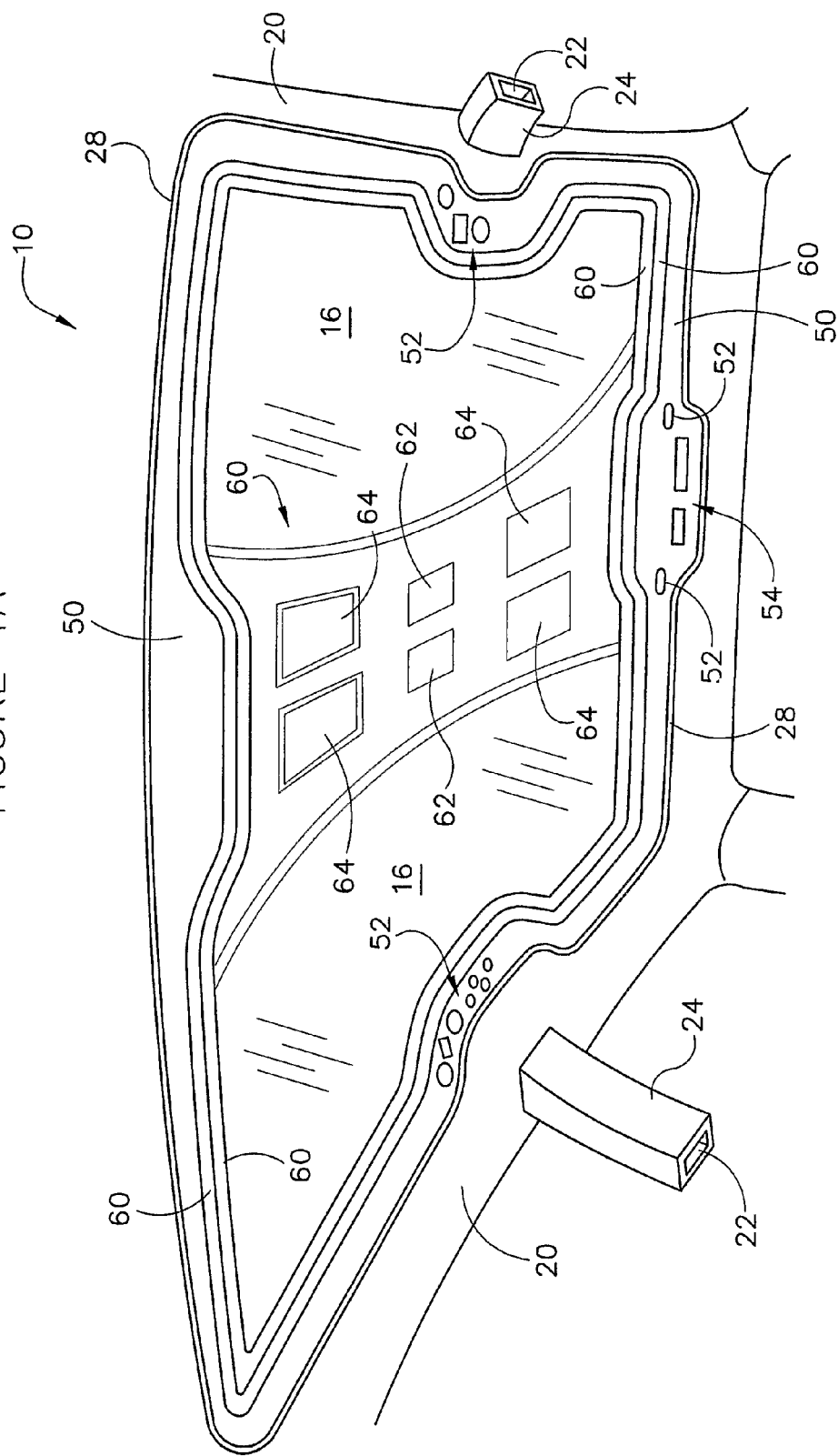
FIG. 4A is a schematic illustration of a roof system having a console with a lighting and media display section integrated with a translucent display panel according to an exemplary embodiment.
Figure 4B:
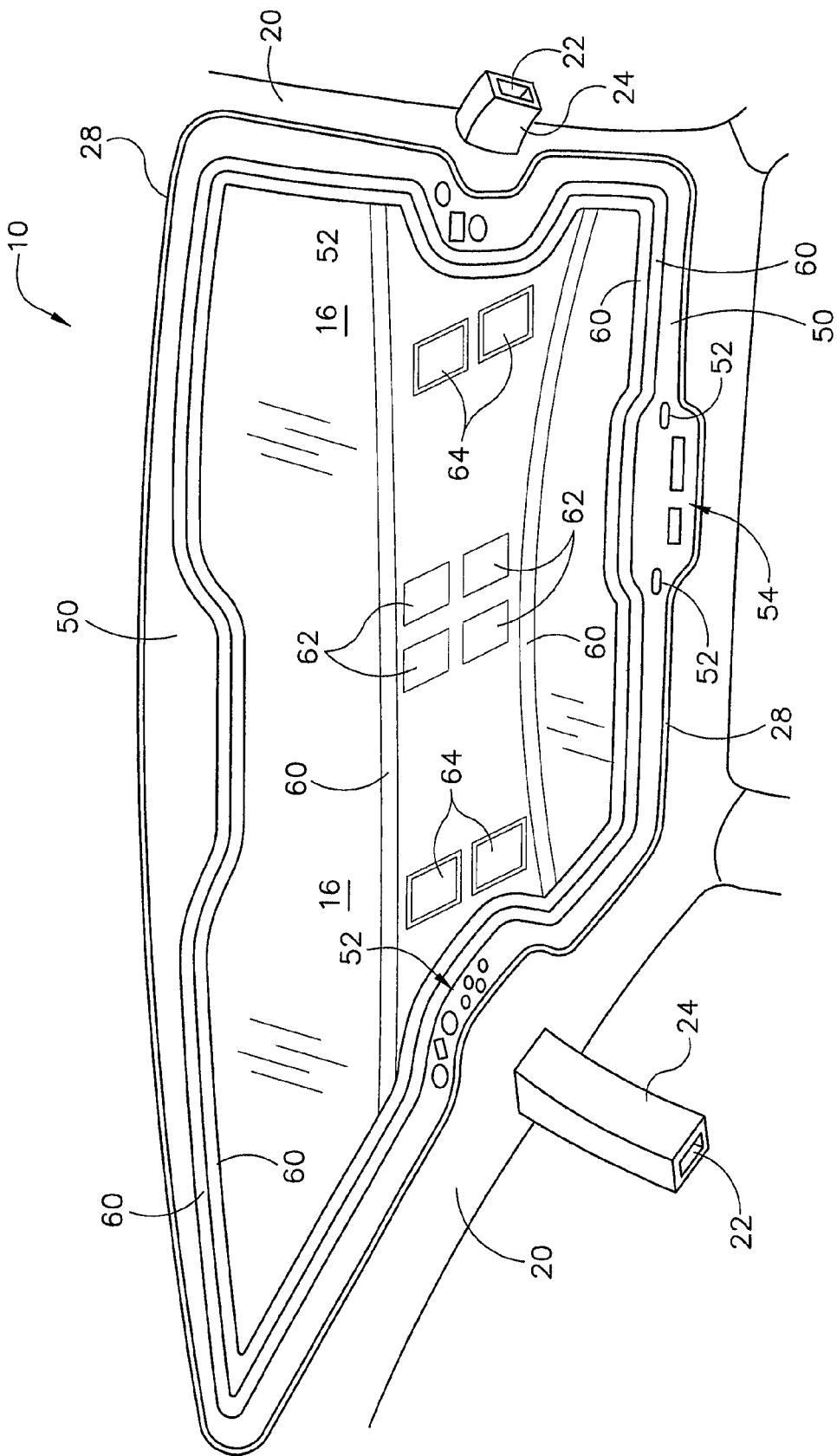
FIG. 4B is a schematic illustration of a roof system having another console with a lighting and media display section integrated with a translucent display panel according to an exemplary embodiment.

Referring to FIGS. 4A and 4B, an alternative embodiment of the roof panels are shown to include a "console" section 70 (which may be "hidden" or exposed) and located at any suitable location on the roof panels. According to the illustrated embodiment of FIGS. 4A and 4B, the console 70 is shown for example as a centrally located console (shown as longitudinally extending in FIG. 4A and laterally extending in FIG. 4B). The console may be used in any suitable roof system application, but is also intended for use in vehicles having a structural crossbow, beam or other support member, where the console is located to correspond with the structural support location. The console may include lights 62 (such as low profile, high-intensity LED task lights, etc.) or any of a wide variety of media display devices 64, such as, but not limited to, song listings from digital music devices that interface with the vehicle information or entertainment system, telephone listings stored in a user's mobile telephone that interfaces with the vehicles communication system, navigational information provided by "permanent" or hand-held GPS devices, vehicle diagnostic or operating data provided by the vehicle's onboard computer system, etc. The displays 64 may be provided by any suitable thin-layer device (e.g. LCD, OLED, etc.) provided in or behind the surface of the panel, and are preferably "hidden" from ordinary view by a translucent (e.g. "smoky", tinted, frosted, reflective, etc.) section of the panel. The portion of the panel overlaying the light 62 or display 64 may be shaped in the form of a lens or other suitable image-enhancing structure to direct the light to an intended location or enhance the readability of a display panel 64. The console 70 may be "bordered" or accented by ambient lighting bands 66, of a type as previously described. The lighting device 62 in the console 70 may also interface with the vehicle's warning or notification system to help alert a driver to an event detected by the vehicle's computer system (e.g. rain, freezing temperatures, abnormal vehicle operating condition, approaching hazards, etc.).

According to any preferred embodiment, a roof system is provided that permits an occupant of the vehicle to choose from a variety of viewing options. The occupant may choose between a vista mode for seeing-through the panels for viewing objects or surroundings (e.g. scenery, signs, structures, etc.) external to the vehicle. The occupant may also choose a privacy mode where visual access through the panels is blocked (e.g. similar to a conventional vehicle roof without viewing capability). The occupant may also choose a display mode (e.g. when viewing of images displayed on the panel is desired or preferred over viewing external objects through the panels). A thin film, transparent display screen is coupled to a roof panel so that the display mode can be activated by energizing the display screen and uploading an image from any suitable type of image source or generator. The display screen may be configured to operate with or without a contrasting back-screen (shown as a privacy panel) and with or without backlighting. The images may be pre-selected or pre-loaded still or dynamic images, or the images may be images received from a remote broadcast source for transmitting to the display panel. The roof system may be formed from multiple panels, or may be provided as a single panel, with or without privacy capability and with or without image display capability. The roof system may include a perimeter ventilation system intended to ventilate the vehicle cabin using a vent extending at least partially around the roof panels. The ventilation system includes an airspace or plenum that may also be configured to direct ventilation for use in cooling the panels of the roof system as necessary (i.e. due to internal or external (e.g. solar, etc.) heat generation). The display panel may also be provided with ambient lighting devices (such as bands extending around the perimeter of the panel, or around consoles or activity stations within the panel, or as "spots' or islands", etc.) and may include a portion (shown as a border portion) arranged to contain instrumentation and user-interfaces in the form of touch activated switches.

The construction and arrangement of the elements of the roof system as shown in the illustrated and other exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited herein (e.g. materials for formation of the panels, technology for displaying images on the display panel, technology for changing a privacy panel between a transparent condition and an opaque condition, technology for communicating image signals to the display panel, etc.). For example, the perimeter trim, ventilation system, user-interface border and ambient lighting band(s) may be used in any suitable combination with one another, and with the roof panel assembly as shown, or with a single transparent roof panel. By further way of example, elements shown as integrally formed may be constructed of multiple parts or elements, the position of elements may be reversed or otherwise varied, and the nature or number of discrete elements or positions may be altered or varied. It should be noted that the elements and/or assemblies of the roof system may be constructed from any of a wide variety of materials that provide sufficient strength or durability, including any of a wide variety of materials (such as thin film plastic) in any of a wide variety of colors, combinations and suitable materials. Other substitutions, modifications, changes and omissions may be made in the design, operating conditions and arrangement of the preferred and other exemplary embodiments without departing from the scope of the present inventions.

The order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration and arrangement of the preferred and other exemplary embodiments without departing from the spirit of the present inventions as expressed herein.

What is claimed is:

1. A roof system for a vehicle, comprising:
a panel assembly including a transparent roof panel, a privacy panel, and a transparent display panel;
an image generator configured to display an image on the display panel; and
a control system operable to control the image generator and to actuate the privacy panel for use in at least one of a transparent mode and an opaque mode.

2. The roof system of claim 1 wherein the roof panel provides weatherproofing and structural support for a roof of the vehicle.

3. The roof system of claim 1 further comprising a gap between the roof panel and the privacy panel, and an illumination device configured to illuminate the gap to provide a backlighting effect on the display panel.

4. The roof system of claim 1 further comprising a perimeter trim member substantially surrounding the panel assembly.

5. The roof system of claim 4 wherein the perimeter trim member is formed to provide an airspace proximate the panel assembly.

6. The roof system of claim 5 wherein the perimeter trim member comprises a vent communicating with the airspace, the vent configured permit a flow of air to ventilate a cabin portion of the vehicle.

7. The roof system of claim 1 wherein the display panel further comprises a user interface.

8. The roof system of claim 7 wherein the user interface includes a plurality of touch-activated switches integrated with an opaque surface disposed on a region of the display panel.

9. The roof system of claim 8 wherein the opaque region comprises a band formed substantially around a perimeter of the display panel and the user interface further comprises a plurality of indicators configured to communicate information to an occupant of the vehicle.

10. The roof system of claim 1 further comprising a console formed on the display panel.

11. The roof system of claim 10 wherein the console is arranged to at least partially correspond to the location of a roof structural element on the vehicle.

12. The roof system of claim 10 wherein the console comprises a high intensity LED illumination source behind a translucent panel configured to provide task lighting to an occupant of the vehicle.

13. The roof system of claim 10 wherein the console provides at least one media display device behind a translucent panel.

14. The roof system of claim 10 further comprising an ambient lighting band disposed around at least a portion of the console.

15. The roof system of claim 1 further comprising at least one ambient lighting device proximate the display panel.

16. The roof system of claim 15, wherein the ambient lighting device comprises at least one ambient lighting band formed substantially adjacent a perimeter of the display panel.

17. The roof system of claim 16 wherein the ambient lighting band includes an illumination device configured to generate visible light in a plurality of colors.

18. The roof system of claim 17 wherein the control system is operable to change the color of the visible light generated by the illumination device to correspond with a color of the image generated on the display panel by the image generator.

19. A roof system for a vehicle, comprising:
at least one substantially transparent panel provided on a roof of a vehicle; and
a perimeter trim member surrounding the transparent panel, the perimeter trim member providing an airspace and a vent configured to provide a source of ventilation extending substantially adjacent to a perimeter of the transparent panel.

20. The roof system of claim 19 wherein the vent is formed by at least partially overlapping segments of the perimeter trim member, the overlapping segments defining a gap between the overlapping segments.

21. The roof system of claim 19 wherein the perimeter trim member is formed as a single piece.

22. The roof system of claim 19 further comprising at least one ambient lighting device extending at least partially around the transparent panel.

23. The roof system of claim 19 further comprising a user interface disposed on the transparent panel, the user interface including at least one touch-activated switch and an information indicator.

24. The roof system of claim 19 wherein the transparent panel is configured to receive data from an image generator and to display an image on the panel for viewing by an occupant of the vehicle.

25. A roof system for a vehicle, comprising:
at least one substantially transparent panel provided on a roof of a vehicle;
a user interface formed on the display panel and comprising a plurality of touch-activated switches and information displays; and
at least one ambient lighting band extending substantially adjacent to a perimeter of the transparent panel.

26. The roof system of claim 25 wherein the user interface is formed in a border region along at least part of a perimeter of the transparent panel.

27. The roof system of claim 25 wherein the ambient lighting band extends at least partially around a perimeter of the transparent panel.

28. The roof system of claim 25 further comprising a one-piece perimeter trim member surrounding the transparent panel.

29. The roof system of claim 28 wherein the perimeter trim member comprises a vent extending substantially around a perimeter of the panel and configured to provide a source of ventilation to a cabin of the vehicle.

* * * * *